United States Patent [19]

Prudhomme

[11] Patent Number: 5,213,874
[45] Date of Patent: May 25, 1993

[54] CANOPY OR SIMILAR MATERIAL HAVING AN IMPROVED TEARING RESISTANCE

[75] Inventor: Pierre Prudhomme, Lozanne, France

[73] Assignee: Tissus Techniques de Trevoux, France

[21] Appl. No.: 839,048

[22] Filed: Feb. 18, 1992

Related U.S. Application Data

[63] Continuation of Ser. No. 650,183, Feb. 4, 1991, abandoned.

[30] Foreign Application Priority Data

Feb. 6, 1990 [FR] France .................. 90 01585
Jul. 2, 1990 [FR] France .................. 90 08583

[51] Int. Cl.$^5$ .................................. B32B 27/14
[52] U.S. Cl. .................... 428/198; 428/223; 428/246; 428/247; 428/253; 428/285; 428/423.1; 428/425.8
[58] Field of Search ............ 428/223, 246, 247, 253, 428/285, 198, 423.1, 425.8

[56] References Cited

U.S. PATENT DOCUMENTS

| | | | |
|---|---|---|---|
| 4,142,017 | 2/1979 | Blackburn et al. | 428/284 |
| 4,298,645 | 10/1981 | Obayashi et al. | 428/110 |
| 4,507,351 | 3/1985 | Johnson et al. | 428/198 |
| 4,673,613 | 6/1987 | Ward | 428/247 |
| 4,683,010 | 7/1987 | Hartmann | 428/253 |
| 4,889,763 | 12/1989 | Brambach | 428/253 |
| 4,993,099 | 2/1991 | Emura et al. | 428/285 |
| 5,108,828 | 4/1992 | Hormann | 428/285 |

FOREIGN PATENT DOCUMENTS

| | | |
|---|---|---|
| 0146521 | 11/1984 | European Pat. Off. |
| 0068934 | 4/1985 | Japan |
| 1098381 | 1/1968 | United Kingdom |

OTHER PUBLICATIONS

"Knitted Outerwear Times", Aug. 26, 1968, WARP KNIT FABRICS AND PRODUCTS, by A. Reisfeld.

*Primary Examiner*—James J. Bell
*Attorney, Agent, or Firm*—Wall and Roehrig

[57] ABSTRACT

A multi-layer fabric having greatly improved tearing resistance is obtained for canopies and tarpaulins and the like by the provision of two-layers of a woven textile fabric positioned on either side of a deformable reinforcing layer formed from wires having a high mechanical strength. The textile layers are bonded to the deformable reinforcing layer by a layer of material having a modulus of elasticity in shear allowing it to break when a force is exerted on the reinforcing wires, thus permitting movement of the wires within the fabric without breaking under the action of the force. Adhesive bonding layers join the outer fiber woven textile material to each other and to the wire loop layer to form a unified fabric structure. Thus, when it is attempted to cut or tear the fabric with a sharp instrument drawn across the surface thereof, the looped wires are displaced and bear successively against one another offering increased resistance until they stop the knife without breaking or tearing further.

11 Claims, 1 Drawing Sheet

CANOPY OR SIMILAR MATERIAL HAVING AN IMPROVED TEARING RESISTANCE

This ia a continuation of copending application Ser. No. 07/650,183 filed on Feb. 4, 1991, now abandoned.

FIELD OF INVENTION

In the sector of protection, especially during railroad transport operations by means of trucks, it has been customary for a very long time to use flexible walls which are designated by the generic expression "canopy" and which consist of sealing, resistant fabrics mounted on a supporting frame defining the volume of the products to be transported. In comparison with the solutions employing rigid walls, generally made of metal, the essential advantage of canopies, in addition to the saving in weight, is that they make the loading and unloading operations easier. However, woven canopies have a major disadvantage, namely in that they do not offer sufficient resistance to tearing, especially to cutting under the action of a sharp object, and consequently afford insufficient protection against theft. To solve this problem, it has been proposed to produce special fabrics (see particularly U.S. Pat. No. 4,298,645). Such fabrics using special yarns have a high production cost and do not offer complete safety, because, when a tear has successfully been initiated by exerting a cutting action of specific intensity, it is possible to enlarge this tear by exerting the same force.

PRIOR ART

In technical sectors other than that of canopies, it has also been known for a very long time to provide reinforced protective surfaces (see especially British Patent No. 1,098,381—publication of the periodical Knitted Outerwear Times—Aug. 25, 1968). The best known uses are complexes which consist of two coated films or fabrics retaining a reinforcing lattice between them, and which are used particularly as protective elements in traveling markets. However, such multilayer articles do not have sufficient mechanical characteristics allowing them to be used as a protective canopy for transport (truck, railway, etc).

SUMMARY OF THE INVENTION

There has now been found, this forming the subject of the present invention, a new type of canopy which can be produced industrially in large quantities and economically in a way similar to multilayer complexes (film/film, fabric/fabric, etc) having an intermediate reinforcement, and which makesit possible to solve these problems in that it has the characteristic of offering a resistance which increases progressively when a force is exerted parallel to its surface under the action of a sharp object, until it opposes any displacement of the said object.

Such a characteristic is obtained as a result of the special structure of the complex according to the invention, this complex consisting of two woven textile structures which retain a reinforcing strengthener between them and which is defined in that:
— said reinforcing strengthener consists of a deformable looped structure produced, for example, from metal wires (or any other wire having similar characteristics):
— the connection between the two outer fabrics is obtained by means of a layer of material having a modulus of elasticity in shear such that the reinforcing strengthener can, under force, break the connecting layer joining the two faces of the outer fabrics to one another by passing through its loops, and such that its component wires retain a freedom of movement, without breaking, under the action of a force exerted through the complex in a direction parallel to its surface, this being in such a way that, during this action, the looped wires are displaced and bear successively against one another until they offer a resistance opposing any progression of said force.

The material which will be used for connecting the two woven layers forming the canopy according to the invention is, for example, a layer of foam-, such as a layer of polyurethane foam (having, for example, a density of 30 kilos per cubic meter), a heat-meltable polyurethane film (having, for example, a thickness of fifty microns), or any other material making it possible to connect the two coated woven layers by passing through the looped reinforcing structure, this being done so that the wires of this looped structure retain a freedom of movement.

It is expedient to note that, if the looped structure used in the material according to the invention is preferably produced on a flat knitting machine, it would, if appropriate, be possible to consider using any other type of material having equivalent deformation characteristics, for example materials of the "netting" type which are composed of metal wires connected to one another not by looping, but by the interlacing or twisting of the metal wires with one another, thereby forming apertures.

Moreover, if the connection between the various layers can be made without an interruption in continuity, according to an improved version this connection can be made by having an alternation of connected zones and unconnected zones in which the reinforcing strengthener is arranged freely between the two outer textile structures.

Such connection "in places" can be obtained in various ways, for example by providing an alternation of strips of connected zones and of unconnected zones or, preferably, by providing non-continuous figures (circular or square surfaces) separated from one another by unconnected zones.

According to such a version, the proportion of connected zones in relation to the unconnected zones will advantageously be equivalent to (50/50).

When the connected zones and unconnected zones take the form of parallel strips spaced apart from one another (for example, strips arranged across the fabric), the tearing resistance will be greatly increased if action is exerted in a direction orthogonal to said strips; in contrast, if the cutting action is exerted cross-wise (parallel to the strip), the resistance will be equivalent to that of a material in which the various layers are connected without any interruption in continuity.

The canopy according to the invention has not only the characteristic of offering very high tearing resistance, but moreover also has additional characteristics inherent both in the specific characteristics of the intermediate connecting layer and in those of the structure of the looped reinforcement, namely:
— that the intermediate connecting layer can perform the function of an insulator,
— that the metal looped reinforcement can serve as a conductive element making it possible to trigger an alarm, provide heating and ensure radar camouflage for the transported articles masked by such a canopy.

However, the invention and the advantages which it affords will be understood better from the exemplary embodiments which are given below as a non-limiting indication and which are illustrated by the accompanying figures of which:

Figure 2A:
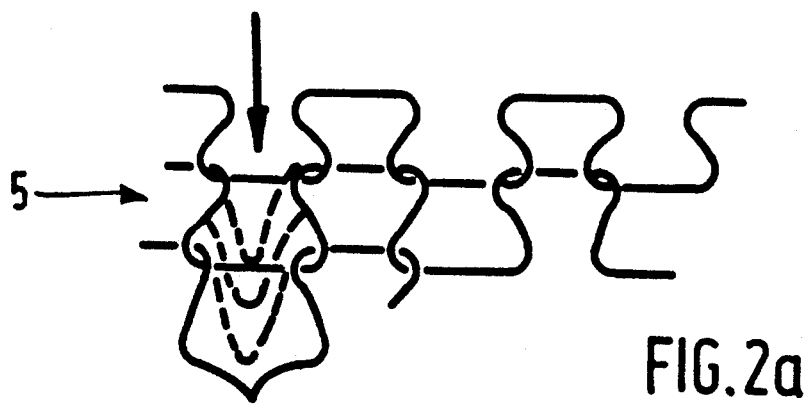
FIGS. 2a and 2b illustrate diagrammatically the displacements of the looped structure within such a canopy when a cutting action is exerted across this canopy by applying a force parallel to its surface.
Figure 2B:
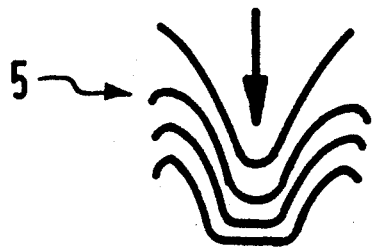

Referring to the accompanying diagrams, in general terms, the canopy according to the invention consists of a complex comprising two woven textile structures (1, 2) which retain a reinforcing strengthener (5) between them. This reinforcing strengthener (5) consists of a deformable looped structure, as shown in FIG. 2a, based on wires with high mechanical characteristics, such as, for example, stainless-steel wires. The connection between the two outer fabrics (1, 2) is obtained by means of an intermediate layer (3, 4) which has a modulus of elasticity in shear such that, under force, the reinforcing strengthener (5) can break this connecting layer. Assembly is carried out by all suitable means, such as by thermal treatment, this being carried out in such a way that the inner connecting layer passes through the loops of the inner reinforcing structure which is thus arranged in the middle position within the complex. The wires of the reinforcing structure retain a freedom of movement, without breaking, under the action of a force exerted through the complex in a direction parallel to this surface, for example by means of a sharp object (6). During the action of this sharp object (6), as emerges from FIGS. 2a and 2b, the looped wires are displaced and bear successively against one another until they offer a resistance opposing any progression of said force.

EXAMPLE 1

Figure 1:
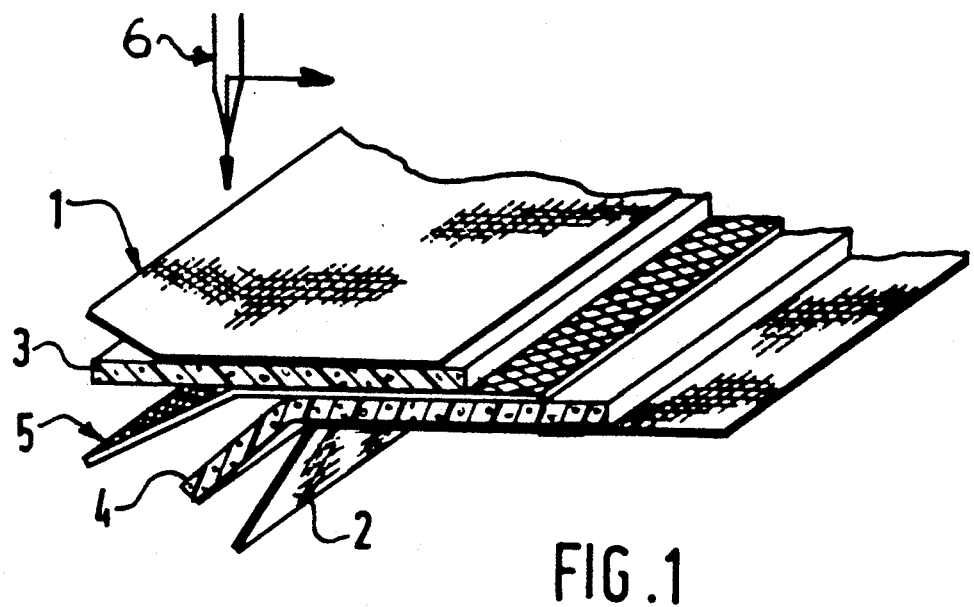
FIG. 1 is an exploded diagrammatic perspective view showing the general structure of a canopy according to the invention.

A canopy according to the invention, as illustrated in FIG. 1, is produced from two coated fabrics consisting of polyester yarns and having a compactness of eight warp yarns per centimeter and eight weft yarns per centimeter, each polyester yarn having a count of 1100 dtex.

Each coated fabric weighs 700 grams per square meter and, taken alone, can be cut by exerting an action with a force of one to two decaNewtons applied in a direction parallel to the surface as a function of the sharp object which is used.

Before the complex according to the invention is produced, each fabric (1, 2) is covered on one of its faces with a layer (3, 4) of polyurethane foam having a density of 30 kilos per cubic meter, this being carried out using a conventional technique, each foam layer having a thickness of approximately one millimeter. Then arranged between the two fabrics so coated with foam is a looped structure (5) consisting of metal wires (stainless steel and with a diameter of 0.3 mm) which is obtained on a flat knitting machine, plain weave machine, etc., this being carried out so as to obtain a latticework in which each row of loops has a height of approximately 0.5 millimeters, the loop density being approximately two columns of loops per centimeter.

The connection of the two fabrics (1, 2) coated with foam (3, 4) on either side of this looped reinforcing structure (5) is made uniformly without an interruption in continuity and is obtained by surface melting in a flame, care being taken to keep the looped reinforcement exactly in the middle zone located between the two outer layers. The finished article has a total thickness of 2.5 millimeters and weights approximately two kilos per square meter. This article is flexible and can be used as a foldable canopy.

Cutting tests conducted by using a "cutter" show that, even if a cut can be initiated over a length of the order of a few centimeters, such a complex is resistant up to a force of between 35 and 40 decaNewtons. Such a result can be explained by the fact that, in the special structure of the canopy, the metal reinforcing structure retained in the middle part can undergo deformation, as indicated diagrammatically in FIGS. 2a and 2b, the loops coming to bear against one another as the sharp object is displaced and therefore offering a resistance which increases progressively until it completely opposes the advance of said sharp object.

As a comparison, a reinforced complex without foam is produced using the same materials as before, that is to say a complex of the previously known type obtained by the bonding of fabric against fabric, with an intermediate reinforcement interposed, is used. Such a bonded complex can be cut by exerting an action with a force of 7 to 9 decaNewtons.

The foregoing comparative example shows clearly the advantages afforded by the material according to the invention, especially the high tearing resistance which it possesses. Moreover, it is also expedient to know that such a material preserves a high flexibility making it possible to fold and unfold the canopy easily.

EXAMPLE 2

A canopy according to the invention is produced in a similar way to Example 1 by using fabrics (1, 2) identical to this Example 1 and by replacing the foam layers (3, 4) with polyurethane films having a thickness of thirty microns and a melting temperature of 110° C. The looped structure (5) interposed in the central part likewise consists of a plain weave flat-knitted fabric likewise produced from stainless-steel wires having a diameter of 0.3 millimeters. The looped structure is looser than that of Example 1, so that the successive columns of loops are connected by loose pieces of greater length. In this exemplary embodiment, the loops have a height of approximately 0.4 millimeters, and the bars extending between two consecutive columns have a length of approximately two centimeters.

The various components are assembled by hot calendering, in such a way that the polyurethane films are fixed to one another by passing through the loops of the reinforcing structure (5).

The complex formed has a thickness of 1.8 millimeters and possesses a cutting resistance of twenty decaNewtons which is therefore likewise clearly higher than that of a fabric/fabric complex without inner reinforcement.

EXAMPLE 3

A canopy according to the invention is produced from the same materials as in Example 2, but the various layers are connected to one another in such a way that connected transverse strips eight centimeters wide, separated from one another by unconnected zones also eight centimeters in width, are produced. In relation to Example 2, it was found that, when a cutting action was exerted by means of a "cutter" in the longitudinal direction (orthogonally relative to the strips), there was first of all a tearing resistance in the bonded zones of the order of 20 decaNewtons (resistance equal to that of the material produced according to Example 2), and suddenly this resistance increased when the unconnected zones were reached, to attain a value capable of rising to 50 and even 70 decaNewtons.

In contrast, with such a material, the resistance in the cross-wise direction has a ceiling at a level of the order of 20 decaNewtons in the zones connected to one another in a similar way to the product of Example 2.

EXAMPLE 4

A complex having the same components as in Example 2 is produced again, but, instead of the connection of the layers being made in the form of uniform strips, this connection is made in the form of figures, for example in the form of square surfaces (of sides of eight centimeters by eight centimeters) spaced three centimeters apart from one another and arranged staggered on the surface of the article, the various bonded zones not touching one another. With such an article, the component elements of which are again the same as those described in Example 2, it is found that the tearing resistance under the action of a sharp object is virtually identical in all directions (longitudinally, cross-wise and obliquely) and likewise reaches values of the order of 50 decaNewtons (instead of 20 decaNewtons when the connection between the various layers is made without an interruption in continuity).

Of course, it will be possible to consider other types of complexes according to the invention, the various layers of which are connected in places. Thus, instead of making the connection between the various layers in the form of square figures spaced apart from one another, it will be possible to consider producing such figures in other forms, for example in the form of circular concentric zones, the connection being made in the central parts and, if appropriate, between two unconnected rings.

It was found, in all instances, that very good results were obtained with an equal proportion of connected zones and unconnected zones.

The connection by zones can be obtained by any suitable means, for example by welding according to predetermined figures.

I claim:

1. A flexible, tear-and cut-resistant canopy or similar fabric web having resistance to cutting and to tearing caused by a sharp object penetrating the canopy and moving in a direction parallel to the surface thereof, comprising:
   first and second outer flexible textile structures;
   a reinforcing strengthener sandwiched between said first and second outer textile structures, said reinforcing strengthener comprising a deformable looped structure formed of wires and high mechanical resistance to cutting by said sharp object; and
   a flexible layer of material joining said first and second outer textile structure through said reinforcing strengthener to each other, without embedding the wires of the reinforcing strengthener in the material, said layer of material having a shear strength low enough to permit the material to yield when said sharp object imposes a tearing force on said textile structure and on said reinforcing strengthener so that the reinforcing strengthener wires can move without breaking in a direction parallel to the surface of the canopy and said tearing force will cause the looped wires to move without breaking and bear successively against one another until they offer sufficient resistance to said tearing force to inhibit further movement of said sharp object.

2. A canopy according to claim 1 wherein the layer of material joining the first and second outer textile structures in continuous throughout the surface area of said structures.

3. A canopy according to claim 1 wherein the layer of material joining the first and second outer textiles structures is formed of individual segments spaced apart from each other so that the first and second structures are joined together intermittently throughout the surface area thereof.

4. A canopy according to claim 3 wherein the individual segments joining said first and second structures are continuous strips separated from one another by strips in which the outer structures are unjoined.

5. A canopy according to claim 3 wherein the individual segments joining said first and second structures comprise spaced apart individual rectangular and circular segments.

6. A canopy according to claim 1 wherein the first and second outer textile structures comprise two layers of coated woven fabric.

7. A canopy according to claim 6 wherein the layer of material joining said first and second outer textile structure comprises a layer of polyurethane foam.

8. A canopy according to claim 6 wherein the layer of material joining said first and second outer textile structure comprises a heat bondable polyurethane film.

9. A canopy according to claim 1 wherein said reinforcing strengthener comprises a balanced flat kit wire layer.

10. A canopy according to claim 1 wherein said reinforcing strengthener comprises a loose flat knit wire fabric including elongated links interlinked with other elongated links which define successive column of loops.

11. A canopy according to claim 1 wherein at least one of said outer textile structures is a woven textile material.

* * * * *

UNITED STATES PATENT AND TRADEMARK OFFICE
CERTIFICATE OF CORRECTION

PATENT NO. : 5,213,874
DATED      : May 25, 1993
INVENTOR(S): Pierre Prudhomme

It is certified that error appears in the above—identified patent and that said Letters Patent is hereby corrected as shown below:

Col. 6, line 4, "and" should be --with--;

line 23, "in" should be --is--;

line 49, "kit" should be --knit--; and line 54, "column" should be --columns--.

Signed and Sealed this

Eleventh Day of January, 1994

Attest:

BRUCE LEHMAN

Attesting Officer    Commissioner of Patents and Trademarks